(12) United States Patent
Beard (10) Patent No.: US 11,442,193 B2
(45) Date of Patent: Sep. 13, 2022

(54) PASSIVE ARM FOR BI-DIRECTIONAL WELL LOGGING INSTRUMENT

(71) Applicant: Halliburton Energy Services, Inc., Houston, TX (US)

(72) Inventor: David R. Beard, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 16/757,991

(22) PCT Filed: May 17, 2019

(86) PCT No.: PCT/US2019/032977
§ 371 (c)(1),
(2) Date: Apr. 21, 2020

(87) PCT Pub. No.: WO2020/236142
PCT Pub. Date: Nov. 26, 2020

(65) Prior Publication Data
US 2022/0075088 A1 Mar. 10, 2022

(51) Int. Cl.
*G01V 3/02* (2006.01)
*E21B 47/002* (2012.01)
(Continued)

(52) U.S. Cl.
CPC .......... *G01V 3/02* (2013.01); *E21B 17/1021* (2013.01); *E21B 23/01* (2013.01); *E21B 47/0025* (2020.05); *G01V 3/38* (2013.01)

(58) Field of Classification Search
CPC ........ G01V 3/02; G01V 3/38; E21B 47/0025; E21B 23/01
(Continued)

(56) References Cited

U.S. PATENT DOCUMENTS

| 1,907,168 A | 5/1933 | Williams |
| 3,060,373 A | 10/1962 | Doll |

(Continued)

FOREIGN PATENT DOCUMENTS

| AU | 2006306702 A1 * | 2/2008 | ......... E21B 17/1021 |
| AU | 2011200562 B1 * | 3/2011 | ......... E21B 17/1021 |

(Continued)

OTHER PUBLICATIONS

SPWLA 61st Annual Logging Symposium, Guner, et al., Quantitative Demonstration of a High-Fidelity Oil-Based Mud Resistivity Imager using a Controlled Experiment, Jun. 24 to Jul. 29, 2020.
(Continued)

*Primary Examiner* — Patrick Assouad
*Assistant Examiner* — Sean Curtis
(74) *Attorney, Agent, or Firm* — John Wustenberg; C. Tumey Law Group PLLC (57) ABSTRACT

A downhole tool may comprise a tool body that is a structural support for the downhole tool, an upper arm attached at one end to the tool body, a pad attached at an opposite end of the upper arm, a lower arm attached at one end to a sliding block and attached to the pad at an opposite end of the lower arm, and a passive arm connected to the lower arm and the tool body. A method may comprise disposing a downhole tool into a borehole, applying a force to a passive arm, applying a second force from the passive arm to the lower arm in response to the force applied to the passive arm, and moving the lower arm and the passive arm in a longitudinal direction along an axis of the downhole tool.

15 Claims, 7 Drawing Sheets

(51) Int. Cl.
  *E21B 23/01* (2006.01)
  *G01V 3/38* (2006.01)
  *E21B 17/10* (2006.01)

(58) Field of Classification Search
  USPC .................................. 324/355–356, 366–367
  See application file for complete search history.

(56) References Cited

U.S. PATENT DOCUMENTS

| | | | |
|---|---|---|---|
| 3,132,298 A | 5/1964 | Doll et al. | |
| 3,379,963 A | 4/1968 | Saurenman | |
| 3,379,964 A | 4/1968 | Segesman | |
| 3,423,671 A | 1/1969 | Vezin | |
| 3,579,098 A | 5/1971 | Mougne | |
| 3,685,158 A | 8/1972 | Planche | |
| 4,121,345 A | 10/1978 | Roesner | |
| 4,251,773 A | 2/1981 | Cailliau et al. | |
| 4,468,623 A | 8/1984 | Gianzero et al. | |
| 4,545,242 A | 10/1985 | Chan | |
| 4,567,759 A | 2/1986 | Ekstrom et al. | |
| 4,588,951 A | 5/1986 | Ohmer | |
| 4,614,250 A | 9/1986 | Panetta et al. | |
| 4,692,908 A | 9/1987 | Ekstrom et al. | |
| 4,757,873 A | 7/1988 | Linyaev et al. | |
| 4,830,105 A * | 5/1989 | Petermann | E21B 17/1021 166/241.1 |
| 4,851,781 A | 7/1989 | Marzetta et al. | |
| 4,857,831 A | 8/1989 | Davies et al. | |
| 4,862,090 A | 8/1989 | Vannier et al. | |
| 4,926,937 A | 5/1990 | Hademenos | |
| 4,979,585 A | 12/1990 | Chesnutt | |
| 5,008,625 A | 4/1991 | Chen | |
| 5,012,193 A | 4/1991 | Chen | |
| 5,022,484 A | 6/1991 | Panetta et al. | |
| 5,038,378 A | 8/1991 | Chen | |
| 5,092,056 A | 3/1992 | Deaton | |
| 5,794,703 A | 8/1998 | Newman et al. | |
| 6,070,677 A * | 6/2000 | Johnston, Jr. | E21B 47/095 175/325.1 |
| 6,112,809 A | 9/2000 | Angle | |
| 6,191,588 B1 | 2/2001 | Chen | |
| 6,560,889 B1 * | 5/2003 | Lechen | E21B 47/08 33/558.2 |
| 6,702,010 B2 | 3/2004 | Yuratich et al. | |
| 6,796,380 B2 * | 9/2004 | Xu | E21B 17/1021 166/381 |
| 6,815,954 B2 | 11/2004 | Iwanicki et al. | |
| 6,851,476 B2 * | 2/2005 | Gray | E21B 47/09 166/301 |
| 6,920,936 B2 * | 7/2005 | Sheiretov | E21B 4/18 166/241.1 |
| 7,069,775 B2 | 7/2006 | Fredette et al. | |
| 7,098,664 B2 * | 8/2006 | Bittar | G01V 3/24 324/357 |
| 7,131,210 B2 | 11/2006 | Fredette et al. | |
| 7,427,863 B2 * | 9/2008 | Bittar | G01V 3/24 324/357 |
| 7,436,185 B2 * | 10/2008 | Fredette | G01V 11/005 250/269.4 |
| 7,509,852 B2 * | 3/2009 | Maute | E21B 47/017 73/152.29 |
| 7,516,782 B2 * | 4/2009 | Sheiretov | E21B 17/1021 166/382 |
| 7,661,477 B2 * | 2/2010 | Sheiretov | E21B 17/1021 166/301 |
| 7,746,078 B2 * | 6/2010 | Bittar | G01V 3/24 324/357 |
| 7,748,476 B2 * | 7/2010 | Krueger, V | E21B 23/01 166/212 |
| 7,784,368 B2 * | 8/2010 | Gibson | F16L 55/30 324/220 |
| 7,886,834 B2 * | 2/2011 | Spencer | E21B 23/01 166/212 |
| RE42,493 E | 6/2011 | Tabarovsky et al. | |
| 8,061,447 B2 * | 11/2011 | Krueger, V | E21B 23/04 166/212 |
| 8,365,822 B2 * | 2/2013 | Jacob | E21B 47/01 166/254.2 |
| 8,464,791 B2 * | 6/2013 | Jacob | G01V 11/005 166/254.2 |
| 8,485,253 B2 * | 7/2013 | Jacob | G01V 11/005 166/254.2 |
| 8,579,037 B2 * | 11/2013 | Jacob | E21B 47/02 166/212 |
| 8,714,270 B2 * | 5/2014 | Clemens | E21B 23/01 166/381 |
| 9,097,086 B2 * | 8/2015 | AlDossary | E21B 23/14 |
| 9,188,698 B2 * | 11/2015 | Tashiro | G01V 11/005 |
| 9,482,067 B2 * | 11/2016 | Dewars | E21B 33/1295 |
| 9,488,020 B2 * | 11/2016 | Krueger, V | E21B 4/18 |
| 10,041,319 B2 * | 8/2018 | Wai | E21B 23/01 |
| 10,156,107 B2 * | 12/2018 | Krueger, V | E21B 4/18 |
| 10,294,744 B2 * | 5/2019 | Robertson | E21B 23/01 |
| 10,550,654 B2 * | 2/2020 | Jaaskelainen | E21B 17/1021 |
| 10,705,242 B2 * | 7/2020 | Jaaskelainen | G01V 3/26 |
| 10,865,614 B2 * | 12/2020 | Robertson | E21B 23/01 |
| 10,920,572 B2 * | 2/2021 | Ratcliffe | E21B 47/01 |
| 10,934,793 B2 * | 3/2021 | Krueger, V | E21B 23/01 |
| 10,968,712 B1 * | 4/2021 | He | E21B 23/01 |
| 11,136,880 B1 * | 10/2021 | McCormick | E21B 47/01 |
| 2003/0024702 A1 * | 2/2003 | Gray | E21B 29/005 166/301 |
| 2005/0211429 A1 * | 9/2005 | Gray | E21B 29/005 166/117.7 |
| 2006/0067162 A1 * | 3/2006 | Blankinship | G01V 1/44 367/35 |
| 2006/0107736 A1 * | 5/2006 | Cens | E21B 17/1021 356/28 |
| 2006/0230846 A1 | 10/2006 | Smith et al. | |
| 2006/0290353 A1 * | 12/2006 | Fredette | G01V 11/005 324/367 |
| 2006/0290354 A1 * | 12/2006 | Fredette | G01V 11/005 324/367 |
| 2009/0236101 A1 * | 9/2009 | Nelson | E21B 17/1021 166/216 |
| 2011/0277990 A1 * | 11/2011 | Kotsonis | E21B 23/01 166/217 |
| 2012/0048541 A1 * | 3/2012 | Jacob | E21B 17/1021 175/50 |
| 2012/0048542 A1 * | 3/2012 | Jacob | E21B 47/01 166/254.2 |
| 2012/0168176 A1 * | 7/2012 | Aguirre | E21B 4/18 166/241.1 |
| 2012/0205093 A1 * | 8/2012 | Paszek | E21B 17/1021 166/241.6 |
| 2013/0113227 A1 * | 5/2013 | Mitchell | E21B 4/18 294/86.24 |
| 2015/0211312 A1 * | 7/2015 | Krueger, V | E21B 23/00 294/86.24 |
| 2016/0298396 A1 * | 10/2016 | Church | E21B 17/1021 |
| 2017/0247963 A1 * | 8/2017 | Krueger, V | E21B 23/01 |
| 2017/0350237 A1 * | 12/2017 | Giem | E21B 23/01 |
| 2019/0063214 A1 * | 2/2019 | Castillo | E21B 17/1057 |
| 2019/0249505 A1 * | 8/2019 | Krueger, V | E21B 23/00 |
| 2019/0271201 A1 * | 9/2019 | Robertson | E21B 23/01 |
| 2020/0040679 A1 * | 2/2020 | Mauchien | E21B 47/09 |
| 2020/0340317 A1 * | 10/2020 | Romer | E21B 23/03 |
| 2021/0048382 A1 * | 2/2021 | Badri | G01N 3/46 |
| 2021/0262324 A1 * | 8/2021 | Al Mulhem | E21B 23/02 |
| 2021/0405016 A1 * | 12/2021 | Capoglu | G01N 33/2823 |
| 2022/0003890 A1 * | 1/2022 | Hou | G01V 3/28 |
| 2022/0075088 A1 * | 3/2022 | Beard | G01V 3/02 |

FOREIGN PATENT DOCUMENTS

| | | | |
|---|---|---|---|
| CA | 685727 | 5/1964 | |
| CA | 2669151 A1 * | 5/2008 | E21B 23/00 |
| CA | 3038005 A1 * | 4/2018 | E21B 23/00 |
| EP | 1281834 | 3/2006 | |
| EP | 1350917 | 3/2008 | |

(56) References Cited

FOREIGN PATENT DOCUMENTS

| GB | 2294074 A | * | 4/1996 | ......... E21B 17/1021 |
|---|---|---|---|---|
| GB | 2459368 | | 10/2009 | |
| WO | 2002037052 | | 5/2002 | |
| WO | WO-2008061100 A1 | * | 5/2008 | ............. E21B 23/00 |
| WO | WO-2012028258 A1 | * | 3/2012 | ......... E21B 17/1021 |
| WO | WO-2012028259 A1 | * | 3/2012 | ......... E21B 17/1021 |
| WO | WO-2012112504 A1 | * | 8/2012 | ......... E21B 17/1021 |
| WO | WO-2015112353 A1 | * | 7/2015 | ............. E21B 23/00 |
| WO | WO-2019040470 A1 | * | 2/2019 | ........... E21B 47/024 |
| WO | 2019177588 | | 9/2019 | |
| WO | WO-2020236142 A1 | * | 11/2020 | ............. E21B 23/01 |

OTHER PUBLICATIONS

Chen, et al. A Novel Array Laterolog Method, Oct. 1998.
SPWLA 38th Annual Logging Symposium, Vigne, et al., Strange Invasion Profiles: What Multiarray Induction Logs can tell us about how Oil-Based Mud affects the invasion process and wellbore stability, Jun. 1997.
SPE22726, Safinya, et al., Improved Formation Imaging with Extended Microelectrical Arrays, 1991.
SPE30584, Smits, et al., High Resolution from a New Laterolog with Azimuthal Imaging, 1995.
SPE Formation Evaluation, Davies, et al., Azimuthal Resistivity Imaging: A New-Generation Laterolog, Sep. 1994.
SPE401, Suau, et al., The Dual Laterolog-R Tool, Jul. 1973.
ISRWO International Search Report and Written Opinion for PCT/US2019/032977 dated Feb. 14, 2020.

\* cited by examiner

PASSIVE ARM FOR BI-DIRECTIONAL WELL LOGGING INSTRUMENT

BACKGROUND

Boreholes drilled into subterranean formations may enable recovery of desirable fluids (e.g., hydrocarbons) using a number of different techniques. A downhole tool may be employed in subterranean operations to determine borehole and/or formation properties.

Traditionally, borehole imager tools may be used in obtaining a detailed characterization of reservoirs. These borehole imager tools may provide a resistivity image of the formation immediately surrounding the borehole. Borehole imager tools may be used to determine formation stratigraphy, dips of the formation layers as well as, borehole and formation stress.

During measurement operations borehole imager tools may extend a pad against the inner wall of a borehole through linkage. Typically, the linkages used to press these pads against the wall may relatively easily close if they encounter an obstruction in one direction but may stick or jam if they encounter an obstruction while moving in the opposite direction.

BRIEF DESCRIPTION OF THE DRAWINGS

For a detailed description of the preferred examples of the disclosure, reference will now be made to the accompanying drawings in which.

DETAILED DESCRIPTION

The present disclosure relates generally to a system and method for a well-logging instruments, such as a multi-pad resistivity imaging tool, which may press one or more pads against a borehole wall. Pads may be able to record data as the pads are pressed against the borehole walls, while moving the instrument in either direction, up-hole or down-hole. Typically, the linkages used to press these pads against the wall may relatively easily close if they encounter an obstruction in one direction but may stick or jam if they encounter an obstruction while moving in the opposite direction. As described below, a passive arm may be added to such linkages to reduce or eliminate the likelihood of jamming when moving in the non-ideal direction.

Figure 1:
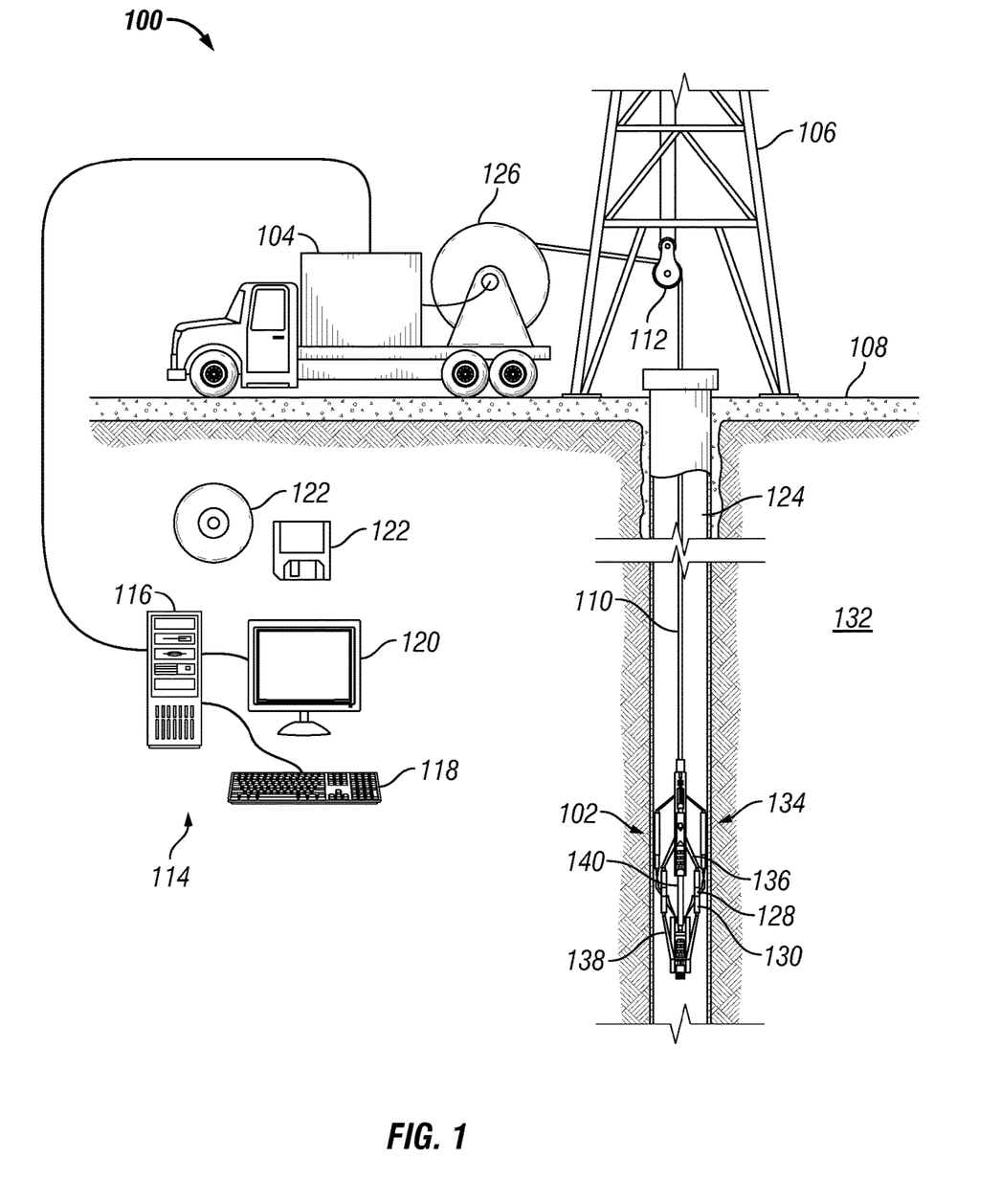
FIG. 1 illustrate an example of a well measurement system.

FIG. 1 illustrates a cross-sectional view of a well measurement system 100. As illustrated, well measurement system 100 may include downhole tool 102 attached to a vehicle 104. In examples, it should be noted that downhole tool 102 may not be attached to a vehicle 104. Downhole tool 102 may be supported by rig 106 at surface 108. Downhole tool 102 may be tethered to vehicle 104 through conveyance 110. Conveyance 110 may be disposed around one or more sheave wheels 112 to vehicle 104. Conveyance 110 may include any suitable means for providing mechanical conveyance for downhole tool 102, including, but not limited to, wireline, slickline, coiled tubing, pipe, drill pipe, drill string, downhole tractor, or the like. In some examples, conveyance 110 may provide mechanical suspension, as well as electrical connectivity, for downhole tool 102. Conveyance 110 may include, in some instances, a plurality of electrical conductors extending from vehicle 104. Conveyance 110 may include an inner core of seven electrical conductors covered by an insulating wrap. An inner and outer steel armor sheath may be wrapped in a helix in opposite directions around the conductors. The electrical conductors may be used for communicating power and telemetry between vehicle 104 and downhole tool 102. Conveyance 110 may lower downhole tool 102 in borehole 124. Generally, borehole 124 may include horizontal, vertical, slanted, curved, and other types of borehole geometries and orientations. Imaging tools may be used in uncased sections of the borehole. Measurements may be made by downhole tool 102 in cased sections for purposes such as calibration.

As illustrated, borehole 124 may extend through formation 132. As illustrated in FIG. 1, borehole 124 may extend generally vertically into the formation 132, however borehole 124 may extend at an angle through formation 132, such as horizontal and slanted boreholes. For example, although FIG. 1 illustrates a vertical or low inclination angle well, high inclination angle or horizontal placement of the well and equipment may be possible. It should further be noted that while FIG. 1 generally depicts a land-based operation, those skilled in the art may recognize that the principles described herein are equally applicable to subsea operations that employ floating or sea-based platforms and rigs, without departing from the scope of the disclosure.

Information from downhole tool 102 may be gathered and/or processed by information handling system 114. For example, signals recorded by downhole tool 102 may be stored on memory and then processed by downhole tool 102. The processing may be performed real-time during data acquisition or after recovery of downhole tool 102. Processing may alternatively occur downhole or may occur both downhole and at surface. In some examples, signals recorded by downhole tool 102 may be conducted to information handling system 114 by way of conveyance 110. Information handling system 114 may process the signals, and the information contained therein may be displayed for an operator to observe and stored for future processing and reference. Information handling system 114 may also contain an apparatus for supplying control signals and power to downhole tool 102.

Systems and methods of the present disclosure may be implemented, at least in part, with information handling system 114. While shown at surface 108, information handling system 114 may also be located at another location, such as remote from borehole 124. Information handling system 114 may include any instrumentality or aggregate of instrumentalities operable to compute, estimate, classify, process, transmit, receive, retrieve, originate, switch, store, display, manifest, detect, record, reproduce, handle, or utilize any form of information, intelligence, or data for business, scientific, control, or other purposes. For example, an information handling system 114 may be a processing unit 116, a network storage device, or any other suitable device and may vary in size, shape, performance, functionality, and price. Information handling system 114 may include random access memory (RAM), one or more processing resources such as a central processing unit (CPU) or hardware or software control logic, ROM, and/or other types of nonvolatile memory. Additional components of the information handling system 114 may include one or more disk drives, one or more network ports for communication with external devices as well as an input device 118 (e.g., keyboard, mouse, etc.) and video display 120. Information handling system 114 may also include one or more buses operable to transmit communications between the various hardware components.

Alternatively, systems and methods of the present disclosure may be implemented, at least in part, with non-transitory computer-readable media 122. Non-transitory computer-readable media 122 may include any instrumentality or aggregation of instrumentalities that may retain data and/or instructions for a period of time. Non-transitory computer-readable media 122 may include, for example, storage media such as a direct access storage device (e.g., a hard disk drive or floppy disk drive), a sequential access storage device (e.g., a tape disk drive), compact disk, CD-ROM, DVD, RAM, ROM, electrically erasable programmable read-only memory (EEPROM), and/or flash memory; as well as communications media such as wires, optical fibers, microwaves, radio waves, and other electromagnetic and/or optical carriers; and/or any combination of the foregoing.

As discussed below, methods may utilize an information handling system 114 to determine and display a high resolution resistivity image of formation 132 immediately surrounding borehole 124. This high resolution resistivity image may depict boundaries of subsurface structures, such as a plurality of layers disposed in formation 132. These formation images may be used in reservoir characterization. Formation images with high resolution may allow accurate identification of thin beds and other fine features such as fractures, clasts and vugs. These formation images may provide information about the sedimentology, lithology, porosity and permeability of formation 132. The formation images may complement, or in some cases replace, the process of coring.

In examples, rig 106 includes a load cell (not shown) which may determine the amount of pull on conveyance 110 at the surface of borehole 124. Information handling system 114 may include a safety valve which controls the hydraulic pressure that drives drum 126 on vehicle 104 which may reel up and/or release conveyance 110 which may move downhole tool 102 up and/or down borehole 124. Conveyance 110 may provide a means of disposing downhole tool 102 into borehole 124. The safety valve may be adjusted to a pressure such that drum 126 may only impart a small amount of tension to conveyance 110 over and above the tension necessary to retrieve conveyance 110 and/or downhole tool 102 from borehole 124. The safety valve is typically set a few hundred pounds above the amount of desired safe pull on conveyance 110 such that once that limit is exceeded; further pull on conveyance 110 may be prevented.

Downhole tool 102 may include a plurality of electrodes, such as button array 128. Downhole tool 102 may also include a return electrode 130. It should be noted that the plurality of electrodes disposed on button array 128 may be any suitable electrode and is should be further noted that return electrode 130 may be any suitable electrode. Button array 128 and/or return electrode 130 may be disposed on at least one pad 134 in any suitable order. For example, a pad 134 may include only button arrays 128 and/or return electrodes 130. Further, a pad 134 may include both button array 128 and return electrodes 130. Pads 134 may attach to a mandrel 140 of downhole tool 102 through upper arm 136 and lower arm 138. It should be noted that mandrel 140 may be defined as the supporting structure of downhole tool 102 which may act as a platform for any peripheral (e.g., upper arm 136, lower arm 138, conveyance 110, etc.) to attach to downhole tool 102. Upper arm 136 and lower arm 138 may extend pad 134 away from downhole tool 102. In examples, both upper arm 136 and lower arm 138 may place pad 134 in contact with borehole 124. It should be noted that there may be any suitable number of arms and/or extensions that may be used to move pad 134 away from downhole tool 102 and in close proximity with borehole 124, or vice versa.

During operations, an operator may energize an individual electrode, or any number of electrodes, of button array 128. A voltage may be applied between the electrode and return electrode 130. The level of the voltage may be controlled by information handling system 114. This may cause currents to be transmitted through the electrode of button array 128. It should be noted that there may be any number of currents transmitted into formation 132. These currents may travel through the mud disposed in borehole 124 and formation 132 and may reach back to return electrode 130. The amount of current emitted by each electrode may be inversely proportional to the impedance seen by the electrode. This impedance may be affected by the properties of formation 132 and the mud directly in front of each electrode of button array 128. Therefore, current emitted by each electrode may be measured and recorded in order to obtain a formation image of the resistivity of formation 132.

To produce a resistivity image of formation 132, a current may be transmitted from at least one transmitter electrode and return to return electrode 130. These two electrodes may be referred to as the current electrodes. Then, the voltage drop across a pair of the electrodes of button array 128 may be measured and used to estimate the impedance of formation 132. In these alternative implementations, button electrodes may be referred to as voltage electrodes or monitor electrodes. Proposed method may operate in any of the two designs above or any other similar oil based mud resistivity imager tool without any limitations.

In examples, downhole tool 102 may operate with additional equipment (not illustrated) on surface 108 and/or disposed in a separate well measurement system (not illustrated) to record measurements and/or values from formation 132 to render a resistivity image of formation 132. Without limitation, downhole tool 102 may be connected to and/or controlled by information handling system 114, which may be disposed on surface 108. Without limitation, information handling system 114 may be disposed down hole in downhole tool 102. Processing of information recorded may occur down hole and/or on surface 108. In addition to, or in place of processing at surface 108, processing may occur downhole. Processing occurring downhole may be transmitted to surface 108 to be recorded, observed, and/or further analyzed. Additionally, information recorded on information handling system 114 that may be disposed down hole may be stored until downhole tool 102 may be brought to surface 108. In examples, information handling system 114 may communicate with downhole tool 102 through a fiber optic cable (not illustrated) disposed in (or on) conveyance 110. In examples, wireless communication may be used to transmit information back and forth between information handling system 114 and downhole tool 102. Information handling system 114 may transmit information to downhole tool 102 and may receive as well as process information recorded by downhole tool 102. In examples, a downhole information handling system (not illustrated) may include, without limitation, a microprocessor or other suitable circuitry, for estimating, receiving and processing signals from downhole tool 102. Downhole information handling system (not illustrated) may further include additional components, such as memory, input/output devices, interfaces, and the like. In examples, while not illustrated, downhole tool 102 may include one or more additional components, such as analog-to-digital converter, filter and amplifier, among others, that may be used to process the measurements of downhole tool 102 before they may be transmitted to surface 108. Alternatively, raw measurements from downhole tool 102 may be transmitted to surface 108.

Any suitable technique may be used for transmitting signals from downhole tool 102 to surface 108. As illustrated, a communication link (which may be wired or wireless and may be disposed in conveyance 110, for example) may be provided that may transmit data from downhole tool 102 to an information handling system 114 at surface 108.

Figure 2:
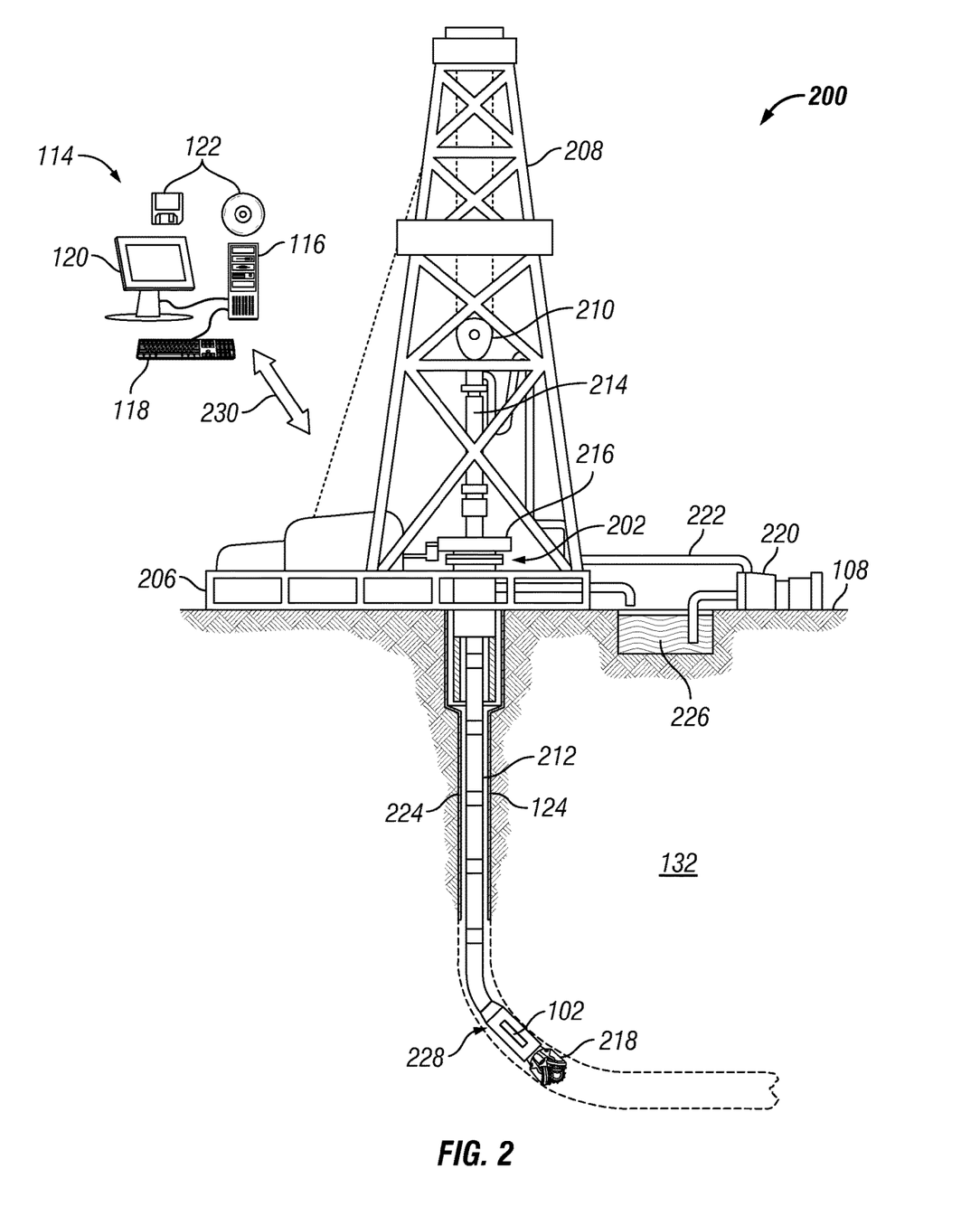
FIG. 2 illustrates another example of a well measurement system.

FIG. 2 illustrates an example in which downhole tool 102 (e.g., referring to FIG. 1) may be disposed in a drilling system 200. As illustrated, borehole 124 may extend from a wellhead 202 into formation 132 from surface 108. As illustrated, a drilling platform 206 may support a derrick 208 having a traveling block 210 for raising and lowering drill string 212. Drill string 212 may include, but is not limited to, drill pipe and coiled tubing, as generally known to those skilled in the art. A kelly 214 may support drill string 212 as it may be lowered through a rotary table 216. A drill bit 218 may be attached to the distal end of drill string 212 and may be driven either by a downhole motor and/or via rotation of drill string 212 from surface 108. Without limitation, drill bit 218 may include, roller cone bits, PDC bits, natural diamond bits, any hole openers, reamers, coring bits, and the like. As drill bit 218 rotates, it may create and extend borehole 124 that penetrates various formations 132. A pump 220 may circulate drilling fluid through a feed pipe 222 to kelly 214, downhole through interior of drill string 212, through orifices in drill bit 218, back to surface 108 via annulus 224 surrounding drill string 212, and into a retention pit 226.

With continued reference to FIG. 2, drill string 212 may begin at wellhead 202 and may traverse borehole 124. Drill bit 218 may be attached to a distal end of drill string 212 and may be driven, for example, either by a downhole motor and/or via rotation of drill string 212 from surface 108 (Referring to FIG. 1). Drill bit 218 may be a part of bottom hole assembly 228 at distal end of drill string 212. Bottom hole assembly 228 may further include downhole tool 102 (Referring to FIG. 1). Downhole tool 102 may be disposed on the outside and/or within bottom hole assembly 228. Downhole tool 102 may include test cell 234. As will be appreciated by those of ordinary skill in the art, bottom hole assembly 228 may be a measurement-while drilling (MWD) or logging-while-drilling (LWD) system.

Without limitation, bottom hole assembly 228 may be connected to and/or controlled by information handling system 114 (e.g., referring to FIG. 1), which may be disposed on surface 108. Without limitation, information handling system 114 may be disposed down hole in bottom hole assembly 228. Processing of information recorded may occur down hole and/or on surface 108. Processing occurring downhole may be transmitted to surface 108 to be recorded, observed, and/or further analyzed. Additionally, information recorded on information handling system 114 that may be disposed down hole may be stored until bottom hole assembly 228 may be brought to surface 108. In examples, information handling system 114 may communicate with bottom hole assembly 228 through a fiber optic cable (not illustrated) disposed in (or on) drill string 212. In examples, wireless communication may be used to transmit information back and forth between information handling system 114 and bottom hole assembly 228. Information handling system 114 may transmit information to bottom hole assembly 228 and may receive as well as process information recorded by bottom hole assembly 228. In examples, a downhole information handling system (not illustrated) may include, without limitation, a microprocessor or other suitable circuitry, for estimating, receiving and processing signals from bottom hole assembly 228. Downhole information handling system (not illustrated) may further include additional components, such as memory, input/output devices, interfaces, and the like. In examples, while not illustrated, bottom hole assembly 228 may include one or more additional components, such as analog-to-digital converter, filter and amplifier, among others, that may be used to process the measurements of bottom hole assembly 228 before they may be transmitted to surface 108. Alternatively, raw measurements from bottom hole assembly 228 may be transmitted to surface 108.

Any suitable technique may be used for transmitting signals from bottom hole assembly 228 to surface 108, including, but not limited to, wired pipe telemetry, mud-pulse telemetry, acoustic telemetry, and electromagnetic telemetry. While not illustrated, bottom hole assembly 228 may include a telemetry subassembly that may transmit telemetry data to surface 108. Without limitation, an electromagnetic source in the telemetry subassembly may be operable to generate pressure pulses in the drilling fluid that propagate along the fluid stream to surface 108. At surface 108, pressure transducers (not shown) may convert the pressure signal into electrical signals for a digitizer (not illustrated). The digitizer may supply a digital form of the telemetry signals to information handling system 114 via a communication link 230, which may be a wired or wireless link. The telemetry data may be analyzed and processed by information handling system 114.

As illustrated, communication link 230 (which may be wired or wireless, for example) may be provided that may transmit data from bottom hole assembly 228 to an information handling system 114 at surface 108. Information handling system 114 may include a processing unit 116 (e.g., referring to FIG. 1), a video display 120 (e.g., referring to FIG. 1), an input device 118 (e.g., keyboard, mouse, etc.) (e.g., referring to FIG. 1), and/or non-transitory computer-readable media 122 (e.g., optical disks, magnetic disks) (e.g., referring to FIG. 1) that may store code representative of the methods described herein. In addition to, or in place of processing at surface 108, processing may occur downhole.

Figure 3:
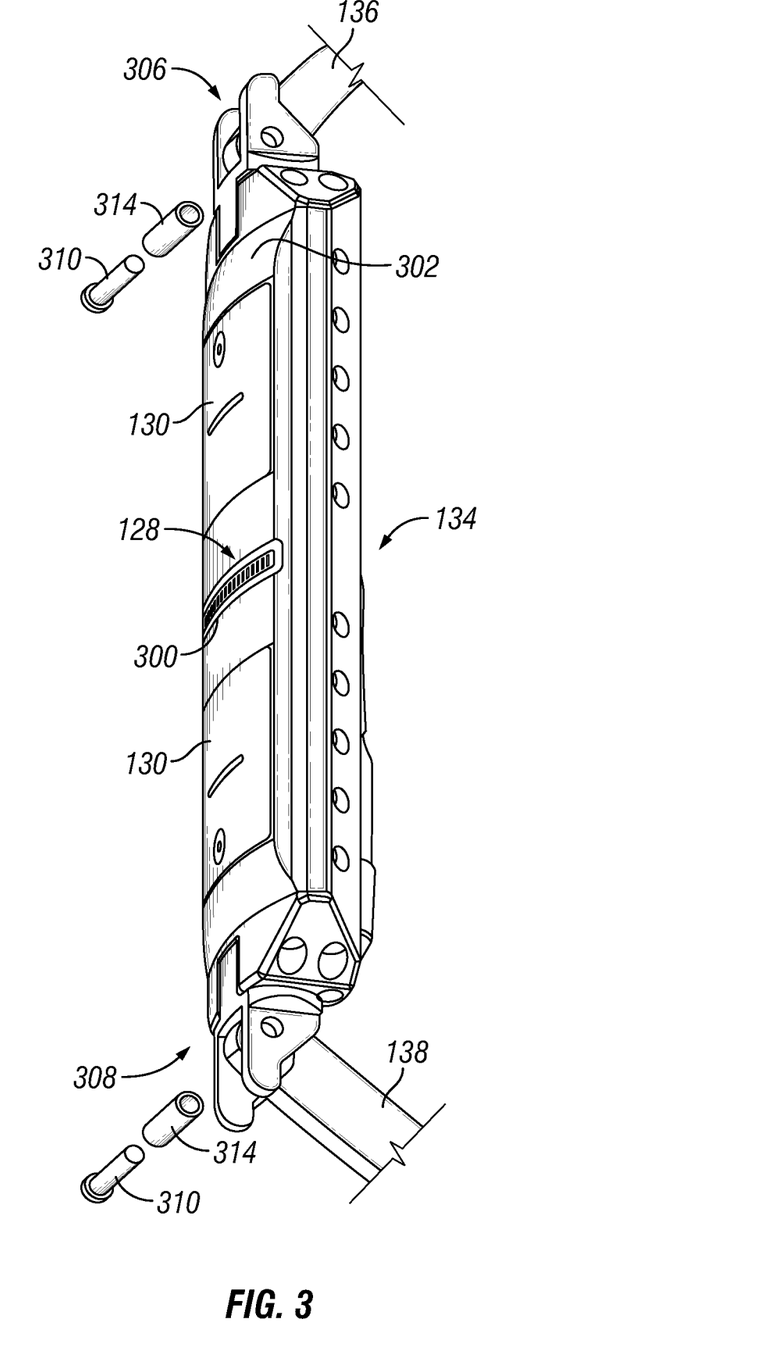
FIG. 3 illustrates an example of a pad.

FIG. 3 illustrates an example of pad 134. It should be noted that pad 134 may be connected to downhole tool 102

(e.g., referring to FIGS. 1 and 2). Pad 134 may serve to place button array 128 and/or return electrode 130 in contact with or in close proximity to borehole 124. Pad 134 may include a button array 128, a return electrode 130, a guard 300, and a housing 302. In examples, there may be a plurality of button arrays 128. In examples, return electrode 130 and button array 128 may be disposed directly on downhole tool 102. Button array 128 may include an injector electrode 304, wherein injector electrode 304 may be a sensor that senses impedance of formation 132. It should be noted that injector electrode 304 may be a button electrode. There may be any suitable number of injector electrodes 304 within button array 128 that may produce a desired, predetermined current. Without limitation, the range for a suitable number of injector electrodes 304 within button array 128 may be from about one injector electrode 304 to about one hundred injector electrodes 304. For example, the range for a suitable number of injector electrodes 304 within button array 128 may be from about one injector electrode 304 to about twenty-five injector electrodes 304, from about twenty-five injector electrodes 304 to about fifty injector electrodes 304, from about fifty injector electrodes 304 to about seventy-five injector electrodes 304, or from about seventy-five injector electrodes 304 to about one hundred injector electrodes 304.

In examples, there may be a plurality of return electrodes 130. One of the return electrodes 130 may be disposed on one side of button array 128, and another one of the return electrodes 130 may be disposed on the opposite side of button array 128. These return electrodes 130 may be disposed at equal distances away from button array 128 or at varying distances from button array 128. Without limitation, the distance from the center of one of the return electrodes to the button array may be from about one inch to about one foot. In examples, a voltage difference between button array 128 and return electrodes 130 may be applied, which may cause currents to be emitted from button array 128 into the mud (not illustrated) and formation 132 (referring to FIG. 1).

During operations, an operator may energize button array 128. A voltage may be applied between each injector electrode 304 and return electrode 130. The level of the voltage may be controlled by information handling system 114. This may cause currents to be transmitted through button array 128. These currents may travel through the mud and formation 132 and may reach back to return electrode 130. The amount of current emitted by each injector electrode 304 may be inversely proportional to the impedance seen by that injector electrode 304. This impedance may be affected by the properties of formation 132 and the mud directly in front of each injector electrode 304. Therefore, current emitted by each injector electrode 304 may be measured and recorded in order to obtain an image of the resistivity of formation 132.

In examples, a current may be transmitted from injector electrode 304 and return to return electrode 130. These two electrodes may be referred to as the current electrodes. Then, the voltage drop across button array 128 may be measured and used to estimate the impedance of formation 132. In these alternative implementations, injector electrodes 304 may be referred to as voltage electrodes or monitor electrodes. Proposed method may operate in any of the two designs above or any other similar oil based mud resistivity imager tool without any limitations. In the rest of the text, the imager tool will be assumed to be of the first design without any loss of generality.

Guard 300 may help to focus most of the current produced by button array 128 into formation 132 radially. Guard 300 may be disposed around button array 128. Guard 300 may include the same potential as button array 128.

In examples, housing 302 may serve to protect button array 128 and return electrodes 130 from the surrounding mud and formation 132. Housing may be made with any suitable material. Without limitation, suitable material may include metals, nonmetals, plastics, ceramics, composites and/or combinations thereof. In examples, housing 302 may be a metal plate. Housing 302 may be connected through upper arm 136 to downhole tool 102 (e.g., referring to FIG. 1). An insulating material may be used to fill the remaining portions of pad 134. In examples, ceramics may be used as the insulating material to fill the remaining portions of pad 134.

As illustrated in FIG. 3, one or more pins 310 may be used to connect upper arm 136 and lower arm 138 to pad 134. Without limitation, a pin 310 may fit through a sleeve 314 and attach an upper housing 306 to upper arm 136. Additionally, a pin 310 may fit through a sleeve 314 and attach a lower housing 308 to a lower arm 138. In examples, pin 310, sleeve 314, upper housing 306, and lower housing 308 may be any type of insulator to prevent electric current from flowing from pad 134 to upper arm 136 or lower arm 138. As discussed below, during measurement operations, pad 134 may inadvertently jam, which may stick downhole tool 102 within borehole 124 (e.g., referring to FIG. 1).

Figure 4:
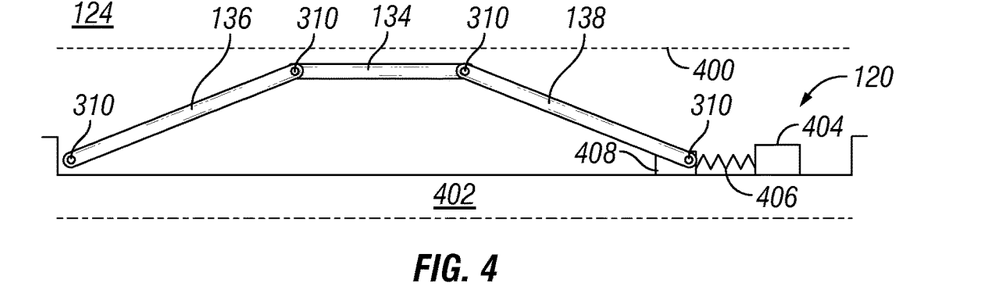
FIG. 4 illustrates an example of current systems and methods for deploying and operating downhole tool in borehole.

FIG. 4 illustrates an example of current systems and methods for deploying and operating downhole tool 102 in borehole 124. Referring to FIG. 1, downhole tool 102 may extend pad 134 outward and dispose pad 134 on the inner wall of borehole 124. It should be noted that FIG. 1 is merely illustrative of the systems and methods that may be used for measurement operations. For example, FIG. 1 illustrates a smooth inner wall for borehole 124, which may be the case when the inner wall of borehole 124 may be lined with a casing. However, during measurement operations, the inner wall of borehole 124 may be jagged, rough, complex, and/or the like. Referring back to FIG. 4, FIG. 4 illustrates an example of downhole tool 102 in a deployed state. As illustrated, pad 134 may be extended toward inner wall 400 of borehole 124. FIG. 4 illustrates a cut away view of downhole tool 102 in which tool body 402 may act as a structural foundation that supports pad 134 and supporting systems.

With continued reference to FIG. 4, downhole tool 102 may include actuator 404 which may operate to move pad 134 toward tool body 402 or inner wall 400. In examples, actuator 404 may move through a leadscrew and nut assembly (not illustrated), which may be driven by an electric motor (not illustrated), or by a push rod (not illustrated) connected to a hydraulic piston (not illustrated). As illustrated, a spring 406 may be connected to actuator 404 at any suitable location on actuator 404 and by any suitable connection. During operations, spring 406 may operate as a dampener, which may allow pad 134 to move toward tool body 402 or toward inner wall 400 based on the terrain that pad 134 may experience as pad 134 traverses inner wall 400. Spring 406 may attach actuator 404 to a slide block 408. Slide block 408 may function as a structural housing which pad 134 may be attached to through lower arm 138. In examples, slide block 408 may operate by sliding along tool body 402 and work together with spring 406 to allow pad 134 to move inward and/or outward from tool body 402. This movement may act as a dampening effect and may allow pad 134 to move around obstacles pad 134 may experience in borehole 124. FIG. 4 further illustrates lower arm 138 pinned to pad 134 by pin 310 at one end of lower arm 138 and lower arm 138 is pinned to slide block 408 by a second pin 310 at the opposite end of lower arm 138.

Without limitation, lower arm 138 may be made of any suitable material. Without limitation, suitable material may include metals, nonmetals, plastics, ceramics, composites and/or combinations thereof and may be between about 6 inches to about 60 inches long (about 5 centimeters to about 150 centimeters), and about 0.25 inch to about 2 inches wide (about 6 millimeters to about 50 millimeters), and about 0.25 inch to about 2 inches deep (about 6 millimeters to about 50 millimeters). It should be noted that upper arm 136 may be similar to lower arm 138 in composition and measurements. As illustrated in FIG. 4, upper arm 136 may be pinned to pad 134 by a pin 310 at one end of upper arm 136 and may be pinned at the opposite end by pin 310 to tool body 402. Each pin 310 may allow both upper arm 136 and lower arm 138 to rotate around each pin 310. This may allow for upper arm 136, lower arm 138, and pad 134 to rotate outward from tool body 402 and inward toward tool body 402 as a single unit. The rotational abilities of upper arm 136, lower arm 138, and pad 134 may press pad 134 against inner wall 400 of borehole 124 (e.g., referring to FIG. 1). Additionally, it may allow for pad 134 to move around any obstructions disposed along inner wall 400.

As illustrated, FIG. 4 shows upper arm 136 and lower arm 138 in a fully extended position. This configuration may be seen if downhole tool 102 (e.g., referring to FIG. 1) might be positioned in borehole 124 (e.g., referring to FIG. 1) whose local diameter, as illustrated by inner wall 400, exceeds the maximum opening diameter of upper arm 136, lower arm 138, and pad 134. During measurement operations upper arm 136 and lower arm 138 may move to an open position by movement of actuator 404. During measurement operations, actuator 404 may move spring 406, which in turn exerts a force on slide block 408. As discussed above, slide block 408 may be connected to lower arm 138 by pin 310. It should be noted that pin 310 may also be a hinge. Additionally, the up-hole end of upper arm 136 may be fixed to tool body 402 by pin 310, so the movement of slide block 408 may force lower arm 138 and upper arm 136, including pad 134, to move away from tool body 402. If pad 134 were to encounter inner wall 400, pad 134 may stop moving radially. As actuator 404 continues to move, spring 406 may compress and apply a force on pad 134, pressing it against inner wall 400 of borehole 124. It should be noted that during measurement operations in which lower arm 138 and upper arm 136, including pad 134, are fully open without encountering an obstruction, lower arm 138, upper arm 136, and pad 134 may jam when encountering an obstruction.

Figure 5:
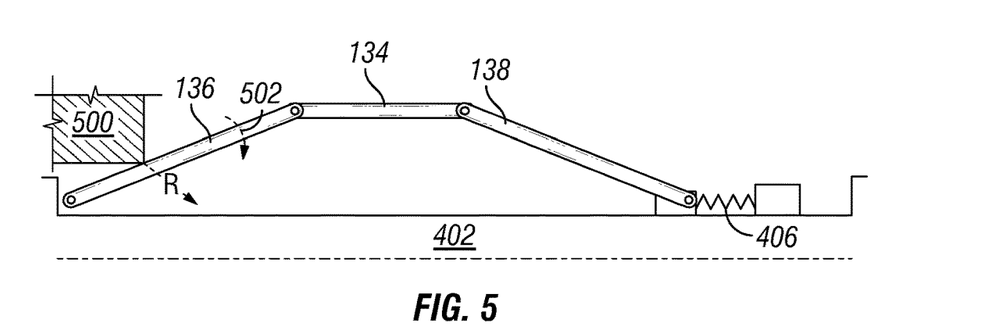
FIG. 5 illustrates an obstruction contacting an upper arm.

Referring to FIG. 5, obstruction 500 may be encountered within borehole 124 (e.g., referring to FIG. 1). As illustrated obstruction 500 may encounter upper arm 136 as downhole tool 102 (e.g., referring to FIG. 1) may travers upward through borehole 124. As illustrated, obstruction 500 may contact upper arm 136 at any location along upper arm 136. FIG. 5 illustrates a stylized obstruction 500, representing, for instance, a sharp reduction in borehole diameter which contacts upper arm 136. In examples, upper arm 136 may move toward tool body 402 to allow pad 134 and lower arm 138 to pass obstruction 500. During this process, upper arm 136, which is rigidly pinned to the tool body 402 by pin 310 at an end of upper arm 136, may rotate in direction 502. As illustrated, pad 134 may not be in contact with inner wall 400 (e.g., referring to FIG. 4) of borehole 124. This may allow upper arm 136 and lower arm 138 to move freely. Upper arm 136 and lower arm 138 may have extra degrees of freedom, and the reaction force with the obstruction, R, is in the correct direction to drive this rotation. Upper arm 136 may therefore rotate clockwise as shown until encounters a constraint. In examples, the connection between upper arm 136 and pad 134 may be constrained so that upper arm 136 and pad 134 cannot pass beyond the co-linear arrangement.

Figure 6:
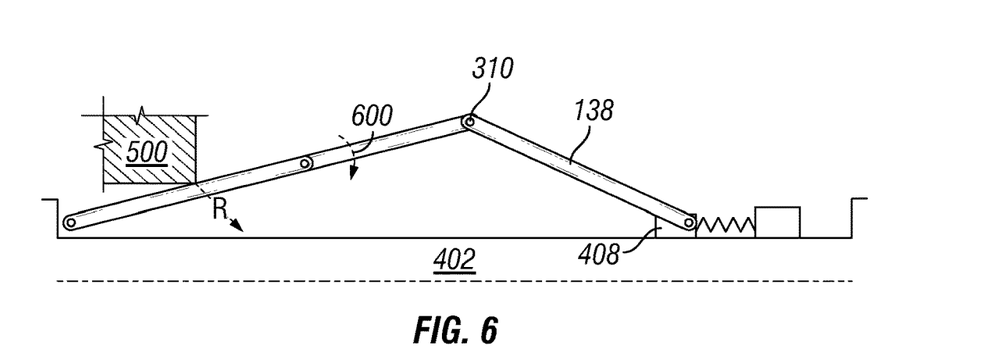
FIG. 6 illustrates a pad and the upper arm constrained in a co-linear arrangement.

FIG. 6 illustrates pad 134 and upper arm 136 constrained in a co-linear arrangement. At this point upper arm 136 and pad 134 may be considered to behave as single element. For upper arm 136 and pad 134 to close further, upper arm 136 and pad 134 may rotate in direction 600. However, as illustrate, for upper arm 136 and pad 134 to rotate, lower arm 138 may move to facilitate the movement of upper arm 136 and pad 134. To do so, lower arm 138 may compress spring 406. Without limitation, upper arm 136, lower arm 138, and pad 134 may close when the reaction force with the obstruction, R, acting through pin 310 that connects lower arm 138 to pad 134, is sufficient to overcome the spring force acting on slide block 408. This may allow downhole tool 102 (e.g., referring got FIG. 1) to move up-hole in borehole 124 (e.g., referring to FIG. 1) as long as spring force is selected so that the axial force in the up-hole direction, Fa, is sufficient to overcome the resolved part of the reaction force, R, in the axial direction, is manageable by the conveyance means selected and the strength of the various mechanical parts such as upper arm 136, lower arm 138, and pad 134.

Figure 7:
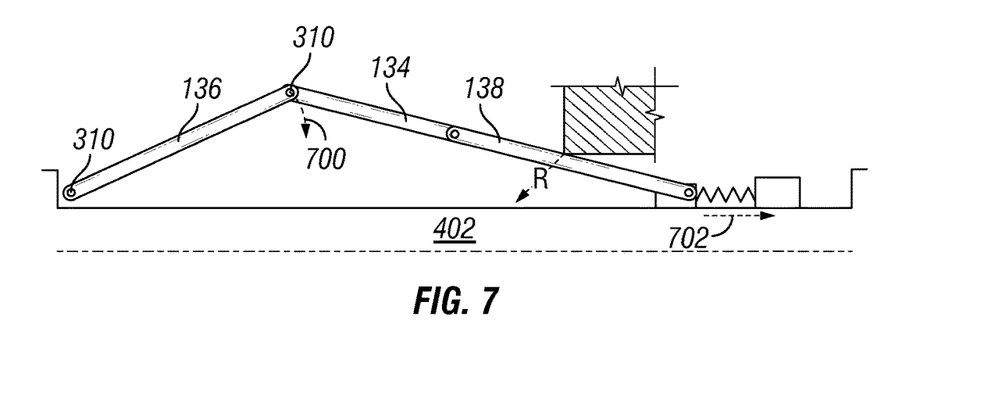
FIG. 7 illustrates examples when the obstruction approaches the upper arm, a lower arm, and the pad from the downhole end of the downhole tool.

FIG. 7 illustrates examples when obstruction 500 approaches upper arm 136, lower arm 138, and pad 134 from the down-hole end of downhole tool 102 (e.g., referring to FIG. 1). Initially, when obstruction 500 contacts lower arm 138, lower arm 138 may start to close freely, just as upper arm 136 functions, as discussed above, due to the extra degree of freedom in lower arm 138, upper arm 136, and pad 134. However, as pad 134 and lower arm 138 reach a limit of relative motion, e.g. their co-linear arrangement, lower arm 138 and pad 134 in a co-linear arrangement may behave differently than upper arm 136 and pad 134 in a co-linear arrangement.

FIG. 7 illustrates pad 134 and lower arm 138 in a co-linear arrangement. To continue to close, pin 310 attaching upper arm 136 and pad 134 may move in an arc 700 whose center is a fixed pin 310 that attached upper arm 136 to tool body 402. For this to happen, pin 310 that connects lower arm 138 to slide block 408 may move to the right as illustrated by arrow 702. To continue to close, the combined element of pad 134 and lower arm 138 may move to the right along arrow 702. It is now no longer clear that the reaction force, R, of the formation on lower arm 138 may be capable of closing lower arm 138.

Figure 8:
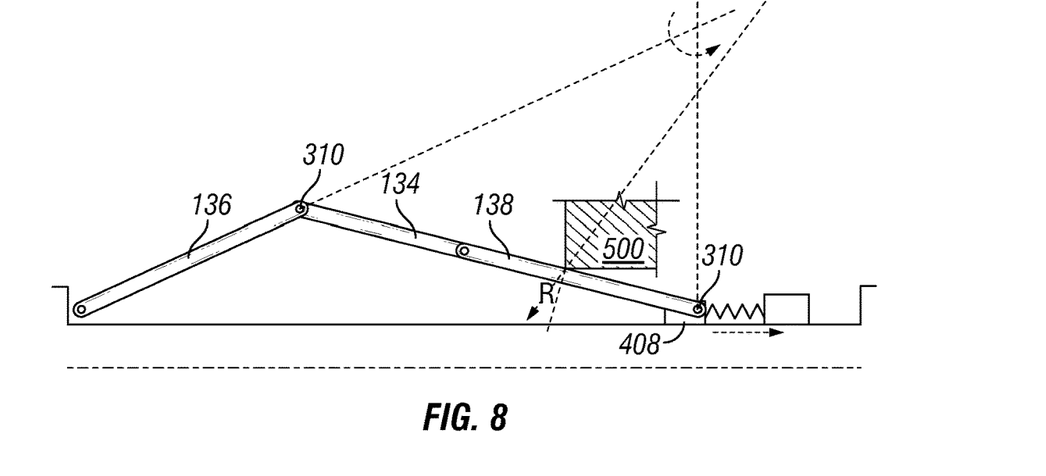
FIG. 8 illustrates the instantaneous center of rotation of the pad and the lower arm in a co-linear arrangement.

FIG. 8 illustrates the instantaneous center of rotation of pad 134 and lower arm 138 in a co-linear arrangement. It is at the intersection of the perpendiculars to the instantaneous direction of motion of pins 310 at either end of lower arm 138 and pad 134. For pin 310 that connects lower arm 138 to slide block 408, this perpendicular is perpendicular to the direction of motion of slide block 408. For pin 310 that connects pad 134 to upper arm 136, the perpendicular is the axis of upper arm 136. For upper arm 136, pad 134, and lower arm 138 to close, pad 134 and lower arm 138 may rotate anti-clockwise about its instantaneous center of rotation. Additionally, FIG. 8 illustrates the extended line of action of the reaction force, R, of obstruction 500 on lower arm 138. As illustrated, the moment of R about the center of rotation is clockwise, i.e. in the opposite direction to the rotation to close upper arm 136, pad 134, and lower arm 138. In this particular geometrical arrangement, reaction force, R, between obstruction 500 and lower arm 138, no matter how large it is, may not close upper arm 136, pad 134, and lower arm 138. Thus, there is no axial force acting in the downhole direction, that would be sufficient to close upper arm 136, pad 134, and lower arm 138, and allow downhole tool 102 (e.g., referring to FIG. 1) to continue moving downhole in borehole 124 (e.g., referring to FIG. 1). This situation may be defined as downhole tool 102 being "jammed."

It should be noted, as illustrated in FIG. 8, the friction angle of the interaction between obstruction 500 and lower arm 138, Φ. It may be seen from this illustration that the presence of friction at this contact also affects whether upper arm 136, pad 134, and lower arm 138 may close. The larger the friction angle the less likely it is that reaction force, R, may be able to close upper arm 136, pad 134, and lower arm 138, which may lead to a jam of downhole tool 102.

Figure 9:
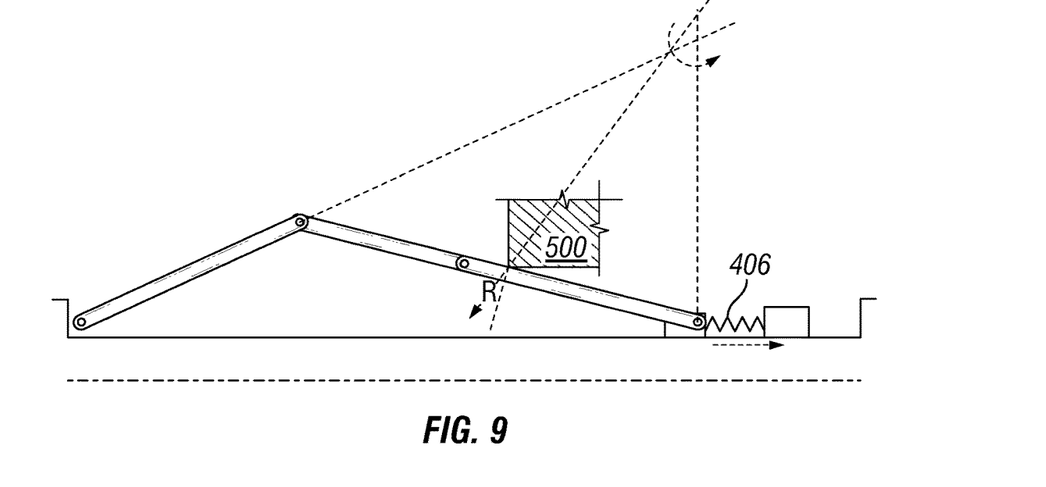
FIG. 9 illustrates when the obstruction encounters the lower arm.

FIG. 9 illustrates when obstruction 500 has a larger diameter and encounters lower arm 138 further from its lower pivot point. In this case, the line of action of the reaction force, R, does pass to the left of the instantaneous center of rotation of pad 134 and lower arm 138 as a co-linear arrangement. Thus, it could conceivably provide the necessary anti-clockwise torque that may close upper arm 136, pad 134, and lower arm 138. However, its perpendicular distance from the center of rotation is small, so it has a relatively small moment arm. It may be seen in FIG. 9 that, in contrast, spring 406 may have a larger moment arm compared to the moment arm of the reaction force large moment arm about the center of rotation, thus a large force, R, may be exerted at the contact point to overcome the rotating force, or torque, from the countering the momentum of spring 406. As a result, a large axial force, Fa, may close upper arm 136, pad 134, and lower arm 138 and allow downhole tool 102 (e.g., referring to FIG. 1) to continue moving downhole. It should be noted that it may not be possible to exert a large downhole force on a tool that is being conveyed by wire-line, because wire-lines cannot be placed in compression. Therefore, an additional mechanism may be utilized with downhole tool 102 to allow for upper arm 136, pad 134, and lower arm 138 to close instead of becoming jammed.

Figure 10:
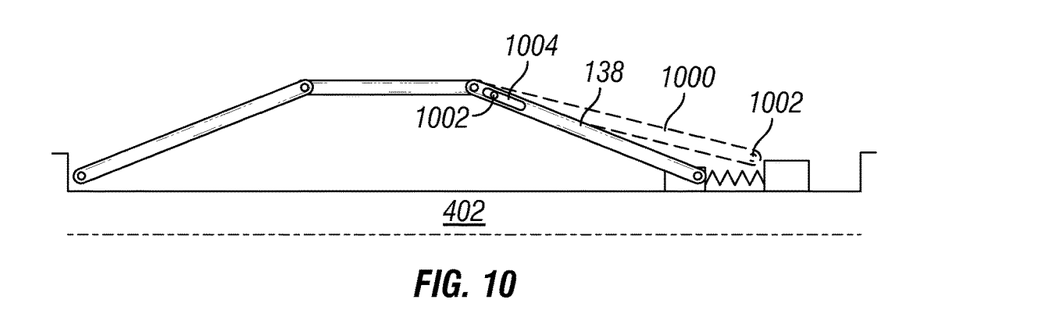
FIG. 10 illustrates a passive arm.

FIG. 10 illustrates a passive arm 1000, which may be added to downhole tool 102 (e.g., referring to FIG. 1) in such a position that at least a part of obstructions 500 that may otherwise contact lower arm 138, may contact passive arm 1000. In examples, passive arm 1000 may be positioned outside of lower arm 138, so that obstructions 500 (e.g., referring to FIG. 9) close to tool body 402 coming from the down-hole direction may contact passive arm 1000 and not lower arm 138. It has a fixed, or substantially fixed, pivot 1002 that may connect tool body 402 to passive arm 1000 at one end. This pivot ensures that its instantaneous center of revolution may be closer to the axis of tool body 402 than any external obstruction 500. Any obstruction 500 which may impinge on passive arm 1000 may rotate passive arm 1000 anti-clockwise, so there may not be a tendency for passive arm 1000 to jam. For example, as passive arm 1000 rotates anti-clockwise, passive arm 1000 may exert a force, via pin 1004 in slot 1006 positioned within lower arm 138 and start to close lower arm 138. IT should be noted that slot 1006 may be position within lower arm 138 along any location of lower arm 138. Additionally, slot 1006 may be any between about 0.25 in long (about 6 millimeters) and the total length of lower arm 138 and of sufficient height to suitable length and height to accommodate pin 1004. In examples, upper arm 136, pad 134, and lower arm 138, initially, may have extra degree of freedom and may close easily until lower arm 138 and pad 134 may lock in their co-linear arrangement as discussed above.

Figure 11:
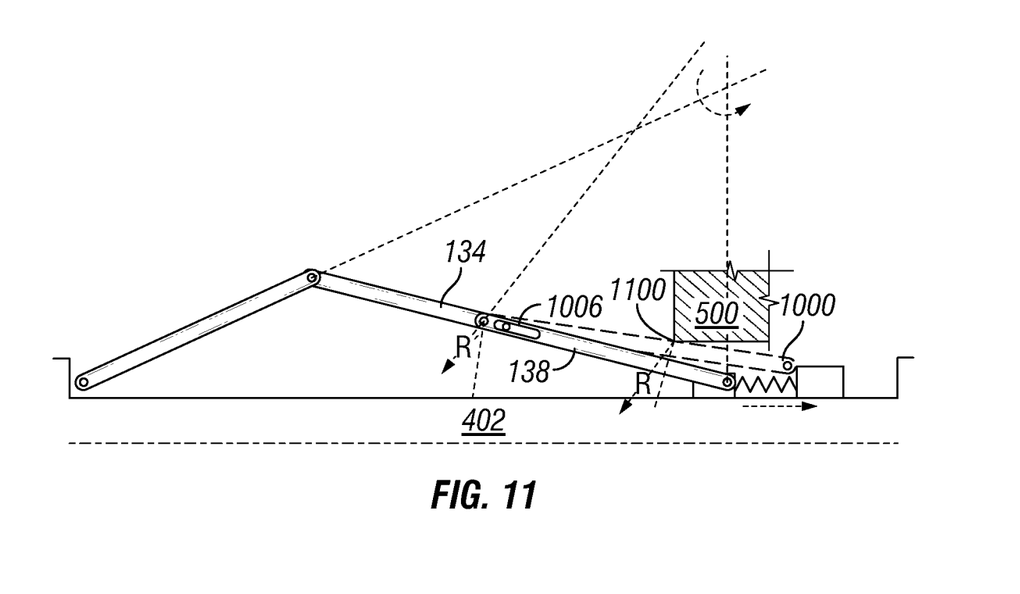
FIG. 11 illustrates the lower arm and the pad in a co-linear arrangement.

Without limitations, as illustrated in FIGS. 10 and 11, passive arm 1000 is shown as behind or inside lower arm 138. This is for illustration purpose only, so that slot 1006 may be viewable within FIGS. 10 and 11. In examples, lower arm 138 may be inside passive arm 1000 at slot 1006, which may increase the likelihood that passive arm 1000 makes contact first with an obstruction 500.

FIG. 11 shows lower arm 138 and pad 134 in a co-linear arrangement. As illustrated, the reaction force, R, from obstruction 500, which is now acting on passive arm 1000, may be in a direction that tends to close passive arm 1000, because pivot 1002 at lower end of passive arm 1000 is fixed. Passive arm 1000 may act on lower arm 138 through the reaction force R'. As illustrated, the reaction force R' may act in the region of slot 1006 in lower arm 138, no matter how close obstruction 500 may be to tool body 402. This increases the likelihood that the reaction force on lower arm 138 has sufficient moment about the instantaneous center of rotation of pad 134 and lower arm 138 in a co-linear arrangement. Additionally, FIG. 11 illustrates the angle of friction, Φ, between pin 310 at the outboard end of passive arm 1000 and slot 1006. As this interaction is occurring between two engineered parts, which may minimize this coefficient of friction by judicious design (e.g. a roller) and selection of materials and surface finish. This is in contrast to the interaction between obstruction 500 and lower arm 138 or passive arm 1000, where there may be little control over the coefficient of friction, Φ.

Figure 12:
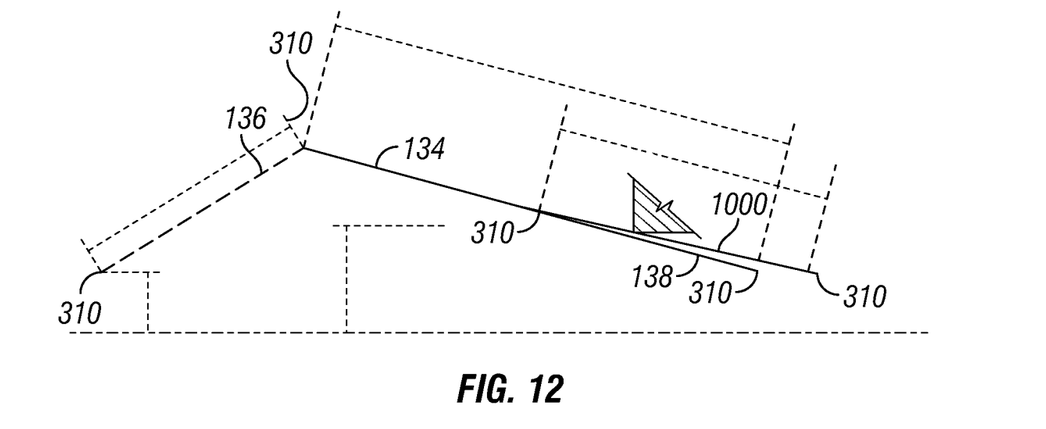
FIG. 12 illustrates a force diagram.

FIG. 12 illustrates a force diagram of upper arm 136, pad 134, and lower arm 138 with passive arm 1000 at the point where lower arm 138 and pad 134 are in a co-linear arrangement. As illustrated, upper arm 136, pad 134, lower arm 138, and passive arm 1000 may be illustrated by lines, pins 310 may be illustrated as points, and spring 406 has been replaced by a force, S. Additionally, pad 134 and lower arm 138 have been replaced by a single element of the same combined length and all pins 310 have been moved to the same radial distance, r_pin, from the tool axis. These simplifications allow the various forces to be calculated using simple geometry and static equilibrium force and static equilibrium torque balance equations.

As illustrate in FIG. 12, R and R' are the same reaction forces discussed above, S is the spring force exerted on sliding block 408, Pin 1 is the joint between upper arm 136 and pad 134, Pin 2 is the joint between lower arm 138 and sliding block 408, Pin 3 is the joint between passive arm 1000 and tool body 402, Pin 4 is attached to passive arm 1000 and is free to slide along the lower arm 138, and Pin 5 is the joint between upper arm 138 and tool body 402. Additionally, r_pin is the distance of each of the pins 1, 2 and 3 from the axis of downhole tool 102, r_bh is the radial position of the point of contact between obstruction 500 and upper arm 136, pad 134, lower arm 138, Fp1 is the force exerted on pad 134 and lower arm 138 by upper arm 136. Note this must be coaxial with upper arm 136 as there is no torque exerted at pin 5. With continued reference to FIG. 12, l_arm is the length of an upper arm 136 or lower arm 138, l_pad is the length of pad 134, l_passive is the length of passive arm 1000, and Fp2 is the reaction force of tool body 402 on sliding block 408, excluding the spring force.

To mathematically illustrate the functionality of passive arm 1000 the following may be used, −S=20 lbf., −r_pin=2.5 in., l_arm=20 in., l_passive=20 in., l_pad=14 in., the coefficient of friction between metal surfaces in slot 1006 and at sliding block 408 is 0.1, and the coefficient of friction between the formation and passive arm 1000 is 0.3.

Figure 13:
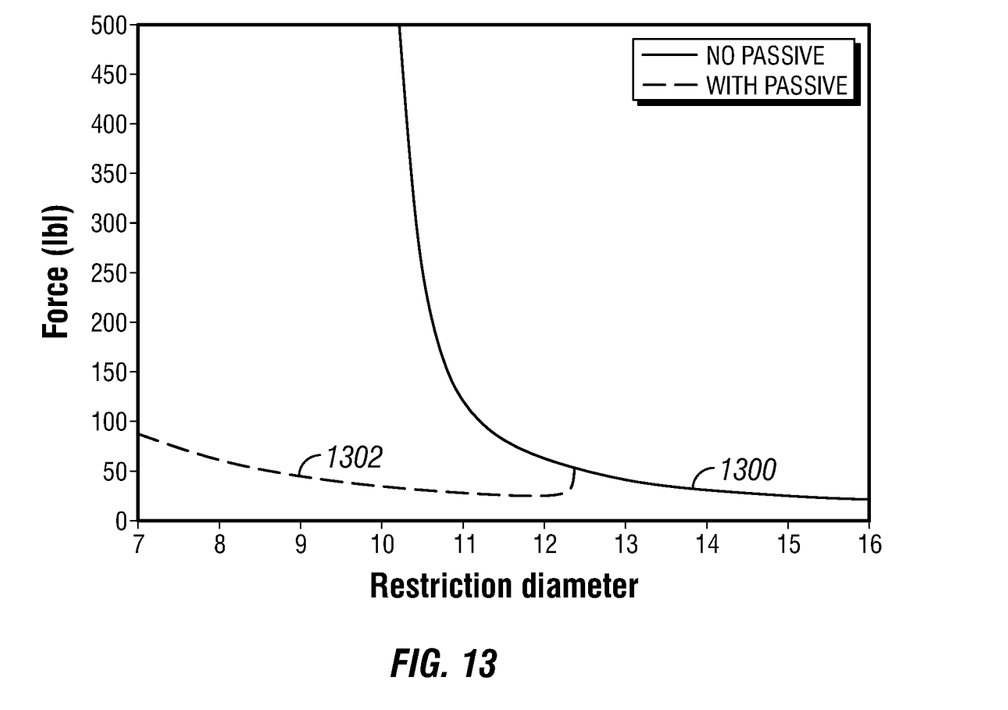
FIG. 13 illustrates a graph of force along the passive arm.

FIG. 13 is a graph of the above mathematical relation which graphs the calculate force per upper arm 136, pad 134, and lower arm 138 to enter a restriction as a function of the restriction diameter, for examples without 1300 or with 1302 proposed passive arm 1000. Without passive arm 1000, as the restriction diameter decreases from 16 in., the maximum tool opening diameter in this example, the axial force needed to enter the restriction increases. Below about a 12 in. restriction diameter it starts to increase rapidly, until at around 10 in. restriction diameter the force goes to infinity. The upper arm 136, pad 134, and lower arm 138 may jam at this point, because there is no value of axial force that may pull upper arm 136, pad 134, and lower arm 138 into the restriction.

With passive arm 1000 the situation improves. Above around 12.4 in restriction diameter, passive arm 1000 has no real effect, because as pad 134 and upper arm 136 move freely into their co-linear position, the restriction clears passive arm 1000 and contacts the combined pad 134 lower arm 138 co-linear arrangement directly. However, below 12.4 in. the effect of passive arm 1000 is evident. Passive arm 1000 may reduce the axial force, and, more importantly eliminates the possibility of jamming, because the axial force never exceeds 100 lbf. A force that should typically be available in the form of the weight of the tools string, which may be greater than 1000 lbf. resolved along the axis of borehole 124 (e.g., referring to FIG. 1).

It should be noted that the description above may be applicable going both uphold and/or downhole within borehole 124. Additionally, it should be noted that upper arm 136 and lower arm 138 do not imply any orientation and the wording "lower" or "upper" may be used interchangeable. Additionally, upper arm 136 and lower arm 138 do not connote position in borehole 124. As discussed above, the systems and methods for a passive arm may include any of the various features of the systems and methods disclosed herein, including one or more of the following statements.

Statement 1. A downhole tool may comprise a tool body that is a structural support for the downhole tool, an upper arm attached at one end to the tool body, a pad attached at an opposite end of the upper arm, a lower arm attached at one end to a sliding block and attached to the pad at an opposite end of the lower arm, and a passive arm connected to the lower arm and the tool body.

Statement 2. The downhole tool of statement 1, further comprising one or more pins that connect the upper arm to the tool body and the pad.

Statement 3. The downhole tool of statement 2, the one or more pins connect the lower arm to the tool body and the sliding block.

Statement 4. The downhole tool of statement 1 or 2, further comprising a spring in which the sliding block is connected to at one end and an actuator is connected at the opposite end of the spring.

Statement 5. The downhole tool of statement 4, wherein an actuator moves the spring and in turn the sliding block through the spring.

Statement 6. The downhole tool of statement 1, 2, or 4, wherein the passive arm is connected at one end to the tool body by a pin and connected to the lower arm by a second pin.

Statement 7. The downhole tool of statement 6, wherein the second pin is placed within a slot that is formed in the lower arm.

Statement 8. The downhole tool of statement 7, wherein the second pin is moveable along a longitudinal length of the slot.

Statement 9. The downhole tool of statements 1, 2, 4 or 6, wherein the passive arm is attached inside the lower arm.

Statement 10. The downhole tool of statements 1, 2, 4, 6, or 9, wherein the passive arm is attached outside the lower arm.

Statement 11. The downhole tool of statements 1, 2, 4, 6, 9, or 10, wherein the pad further comprises one or more electrodes.

Statement 12. A method may comprise: disposing a downhole tool into a borehole, the downhole tool comprises: an upper arm attached to the downhole tool at one end and a pad attached to an opposite end of the upper arm, a lower arm attached to the downhole tool at one end and the pad at an opposite end of the lower arm, and a passive arm attached to the downhole tool at one end and the lower arm at an opposite end of the passive arm, applying a force to a passive arm, applying a second force from the passive arm to the lower arm in response to the force applied to the passive arm, and moving the lower arm and the passive arm in a longitudinal direction along an axis of the downhole tool.

Statement 13. The method of statement 12, further comprising applying a second force to the upper arm.

Statement 14. The method of statements 12 or 13, further comprising moving the upper arm and the lower arm in the longitudinal direction along the axis of the downhole tool.

Statement 15. The method of statements 12 to 14, further comprising moving the pad radially inward.

Statement 16. A downhole tool may comprise: a tool body that is a structural support for the downhole tool; a pad; a lower arm attached at one end to a sliding block and attached to the pad at an opposite end of the lower arm; and a passive arm connected to the lower arm and the tool body.

Statement 17. The downhole tool of statement 16, wherein the lower arm includes a slot.

Statement 18. The downhole tool of statement 17, wherein the passive arm includes a pin that is placed within the slot.

Statement 19. The downhole tool of statement 18, wherein the pin moves longitudinally within the slot.

Statement 20. The downhole tool of statement 19, wherein the passive arm is positioned inside the lower arm.

Although the present disclosure and its advantages have been described in detail, it should be understood that various changes, substitutions and alterations may be made herein without departing from the spirit and scope of the disclosure as defined by the appended claims. The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A downhole tool comprising: a tool body that is a structural support for the downhole tool; an upper arm attached at one end to the tool body; a pad attached at an opposite end of the upper arm; a lower arm attached at one end to a sliding block and attached to the pad at an opposite end of the lower arm; a passive arm connected to the lower arm and the tool body, wherein the passive arm is directly connected to the lower arm via a pin and slot arrangement; and a spring in which the sliding block is connected to at one end and an actuator is connected at the opposite end of the spring.

2. The downhole tool of claim 1, further comprising one or more pins that connect the upper arm to the tool body and the pad.

3. The downhole tool of claim 2, the one or more pins connect the lower arm to the tool body and the sliding block.

4. The downhole tool of claim 1, wherein an actuator moves the spring and in turn the sliding block through the spring.

5. The downhole tool of claim 1, wherein the passive arm is connected at one end to the tool body by a pin and connected to the lower arm by a second pin.

6. The downhole tool of claim 5, wherein the second pin is placed within a slot that is formed in the lower arm.

7. The downhole tool of claim 6, wherein the second pin is moveable along a longitudinal length of the slot.

8. The downhole tool of claim 1, wherein the passive arm is attached inside the lower arm.

9. The downhole tool of claim 1, wherein the pad further comprises one or more electrodes.

10. A method comprising: disposing a downhole tool into a borehole, the downhole tool comprises: an upper arm attached to the downhole tool at one end and a pad attached to an opposite end of the upper arm; a lower arm attached to the downhole tool at one end and the pad at an opposite end of the lower arm; and a passive arm attached to the downhole tool at one end and the lower arm at an opposite end of the passive arm, wherein the passive arm is directly connected to the lower arm via a pin and slot arrangement, and wherein the passive arm is attached outside the lower arm; applying a force to a passive arm; applying a second force from the passive arm to the lower arm in response to the force applied to the passive arm; and moving the lower arm and the passive arm in a longitudinal direction along an axis of the downhole tool.

11. The method of claim 10, further comprising applying a second force to the upper arm.

12. The method of claim 11, further comprising moving the upper arm and the lower arm in the longitudinal direction along the axis of the downhole tool.

13. The method of claim 10, further comprising moving the pad radially inward.

14. A downhole tool comprising: a tool body that is a structural support for the downhole tool; a pad; a lower arm attached at one end to a sliding block and attached to the pad at an opposite end of the lower arm, wherein the lower arm includes a slot; and a passive arm connected to the lower arm and the tool body, wherein the passive arm is directly connected to the lower arm via a pin and slot arrangement, wherein the passive arm includes a pin that is placed within the slot of the lower arm, and wherein the pin moves longitudinally within the slot.

15. The downhole tool of claim 8, wherein the passive arm is positioned inside the lower arm.

* * * * *

UNITED STATES PATENT AND TRADEMARK OFFICE
CERTIFICATE OF CORRECTION

PATENT NO. : 11,442,193 B2
APPLICATION NO. : 16/757991
DATED : September 13, 2022
INVENTOR(S) : David R. Beard

Page 1 of 1

It is certified that error appears in the above-identified patent and that said Letters Patent is hereby corrected as shown below:

In the Claims

Claim 15 at Column 16, Line 50, please change "of claim 8" to --of claim 14--.

Signed and Sealed this
First Day of November, 2022

Katherine Kelly Vidal
*Director of the United States Patent and Trademark Office*